(12) United States Patent
Muneyasu

(10) Patent No.: US 9,744,999 B2
(45) Date of Patent: Aug. 29, 2017

(54) VEHICLE FRONT PORTION STRUCTURE

(71) Applicant: TOYOTA JIDOSHA KABUSHIKI KAISHA, Toyota-shi (JP)

(72) Inventor: Junichiro Muneyasu, Tokai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/168,793

(22) Filed: May 31, 2016

(65) Prior Publication Data

US 2016/0362142 A1    Dec. 15, 2016

(30) Foreign Application Priority Data

Jun. 15, 2015 (JP) .................................. 2015-120487

(51) Int. Cl.
*B62D 25/08* (2006.01)
*B62D 1/16* (2006.01)
*B60K 37/06* (2006.01)
*B62D 25/14* (2006.01)

(52) U.S. Cl.
CPC ............ *B62D 25/081* (2013.01); *B60K 37/06* (2013.01); *B62D 1/16* (2013.01); *B62D 25/145* (2013.01)

(58) Field of Classification Search
CPC .. B62D 25/081; B62D 25/082; B62D 25/145; B62D 25/088; B62D 25/14; B62D 25/04; B62D 27/02
USPC ........... 296/192, 96.21, 187.09, 208, 193.02, 296/193.11; 180/219, 229, 90, 89.1; 280/779, 70, 72
See application file for complete search history.

(56) References Cited

U.S. PATENT DOCUMENTS

| 5,082,078 | A | * | 1/1992 | Umeda | ................ | B62D 25/081 180/90 |
| 5,564,769 | A | * | 10/1996 | Deneau | ................ | B62D 25/145 180/90 |
| 8,491,043 | B2 | * | 7/2013 | Yamagishi | ........... | B62D 25/081 296/192 |

(Continued)

FOREIGN PATENT DOCUMENTS

| JP | 2013-82245 | 5/2013 |
| JP | 2014-31106 A | 2/2014 |
| JP | 2014-31108 | 2/2014 |

*Primary Examiner* — Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A vehicle front portion structure includes: an instrument panel reinforcement that extends in a vehicle width direction and supports a steering column; a cowl that is disposed at the vehicle forward side of the instrument panel reinforcement and is provided with a recessed portion that is open toward a vehicle upward side and extends along the vehicle width direction; a coupling member that couples the instrument panel reinforcement and the cowl to each other in a vehicle forward and rearward direction, at a predetermined position in the vehicle width direction; and a bracket that is disposed at the cowl at a front side in the vehicle forward and rearward direction, and on an extension line, of the coupling member, that closes off an open side of the recessed portion in the vehicle forward and rearward direction, and has a ridgeline that extends in the vehicle forward and rearward direction.

8 Claims, 4 Drawing Sheets

(56) References Cited

U.S. PATENT DOCUMENTS

| | | | |
|---|---|---|---|
| 8,690,230 B2* | 4/2014 | Suzaki | B62D 25/081 296/192 |
| 8,915,539 B2* | 12/2014 | Matsuoka | B62D 25/08 296/192 |
| 2015/0145237 A1* | 5/2015 | Morita | B62D 25/145 280/779 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2015-120487 filed on Jun. 15, 2015, the disclosure of which is incorporated by reference herein.

BACKGROUND

Technical Field

The present invention relates to a vehicle front portion structure.

Related Art

A technology has been disclosed where a reinforcement is placed between a cowl upper member and a cowl lower member disposed at an upper side and a lower side of a lower portion of a front windshield glass of an automobile to thereby locally improve the rigidity of the cowl in the vehicle width direction, control cross-sectional deformation of the cowl, and control vibration of the front windshield glass (e.g., see FIG. 5 and FIG. 6 of Japanese Patent Application Laid-open (JP-A) No. 2013-82245).

It is conceivable for this technology to be applied to control vibration of a steering column of an automobile.

However, this technology controls vibration of the front windshield glass and is not sufficient to control vibration of the steering column. That is, there has been room for improvement in order to control vibration of the steering column.

SUMMARY

In consideration of the circumstances described above, it is an object of the present invention to provide a vehicle front portion structure that can utilize the rigidity of the cowl to control vibration of the steering column.

A first aspect of the present invention is a vehicle front portion structure including: an instrument panel reinforcement that extends in a vehicle width direction and supports a steering column; a cowl that is disposed at a vehicle forward side of the instrument panel reinforcement and that is provided with a recessed portion that is open toward a vehicle upward side and extends along the vehicle width direction; a coupling member that couples the instrument panel reinforcement and the cowl to each other in a vehicle forward and rearward direction, at a predetermined position in the vehicle width direction; and a bracket that is disposed at the cowl at a front side in the vehicle forward and rearward direction, and on an extension line, of the coupling member, that closes off an open side of the recessed portion in the vehicle forward and rearward direction, and that has a ridgeline that extends in the vehicle forward and rearward direction.

In this vehicle front portion structure, the bracket is disposed on the recessed portion of the cowl at a predetermined position in the vehicle width direction, so that the open side of the recessed portion of the cowl that is open toward the vehicle upward side is closed off in the vehicle forward and rearward direction. Because of this, a closed cross section portion is formed by the recessed portion and the bracket. Furthermore, the bracket is disposed at the cowl at the front side in the vehicle forward and rearward direction, and on an extension line, of the coupling member, so the rigidity of the vehicle front portion structure in the vehicle forward and rearward direction is particularly improved. Furthermore, the bracket has the ridgeline that extends in the vehicle forward and rearward direction, so the bracket has sufficient rigidity with respect to a load in the vehicle forward and rearward direction.

The instrument panel reinforcement that supports the steering column is coupled to the cowl via the coupling member. The rigidity with which the steering column is supported by the vehicle front portion structure including the cowl is high, so vibration of the steering column is controlled.

A second aspect of the present invention is the first aspect of the present invention, wherein the coupling member is disposed at a plurality of predetermined positions in the vehicle width direction of the cowl, and the bracket is disposed on an extension line of the coupling member that is closest to a fixed position of the steering column in the vehicle width direction.

In the second aspect of the present invention, in a case where the coupling member is disposed at a plurality of predetermined positions in the vehicle width direction of the cowl, the bracket is disposed on an extension line of the coupling member that is closest to the fixed position of the steering column in the vehicle width direction. That is, by disposing the bracket on an extension line of the coupling member that is closest to the fixed position of the steering column of the instrument panel reinforcement to thereby form a closed cross section portion in the recessed portion of the cowl, the rigidity with which the steering column is supported is enhanced, so vibration of the steering column can be effectively controlled.

A third aspect of the present invention is the first aspect or the second aspect of the present invention, wherein a reinforcement member that partitions, in the vehicle width direction, a space formed by the bracket and the recessed portion, is disposed between the bracket and the recessed portion.

In the third aspect of the present invention, the reinforcement member that partitions, in the vehicle width direction, the space formed between the bracket and the cowl is disposed, so the rigidity of the cowl can be improved even more. As a result, the rigidity with which the cowl supports the steering column is improved even more, and vibration of the steering column can be controlled even more.

A fourth aspect of the present invention is any one of the first aspect to the third aspect of the present invention, further including a first closed cross section portion that is formed at the cowl at a vehicle forward side of the recessed portion, that extends in the vehicle width direction, and that supports a rear end of a hood and a second closed cross section portion that is formed at the cowl at a vehicle rearward side of the recessed portion, that is coupled to the instrument panel reinforcement by the coupling member, and that extends in the vehicle width direction, wherein the bracket is disposed at the cowl between the first closed cross section portion and the second closed cross section portion.

In the vehicle front portion structure of the fourth aspect of the present invention, the first closed cross section portion of the cowl, the recessed portion of the cowl, the second closed cross section portion of the cowl, the coupling member, and the instrument panel reinforcement are disposed from the vehicle forward side in the vehicle forward and rearward direction. Of these, the first closed cross section portion, the second closed cross section portion, and the instrument panel reinforcement extend in the vehicle width direction, and their rigidity is relatively high in the vehicle front portion structure. Here, the rigidity of the vehicle front portion structure in the vehicle forward and rearward direction is enhanced as a result of the instrument panel reinforcement and the second closed cross section portion of the cowl being coupled to each other in the vehicle forward and rearward direction by the coupling member at a predetermined position in the vehicle width direction, and the rigidity of the vehicle front portion structure in the vehicle forward and rearward direction is enhanced as a result of the open side of the recessed portion that is formed between the first closed cross section portion and the second closed cross section portion of the cowl and is open toward the vehicle upward side being closed off in the vehicle forward and rearward direction by the bracket to form a closed cross section portion (as a result of the second closed cross section portion being coupled to the first closed cross section portion via the bracket). The instrument panel reinforcement that supports the steering column is coupled to the cowl via the coupling member. That is, the rigidity with which the steering column is supported by the vehicle front portion structure is improved, so vibration of the steering column can be controlled.

In particular, the bracket is disposed at front side in the vehicle forward and rearward direction, and on an extension line, of the coupling member, and the ridgeline that extends in the vehicle forward and rearward direction is formed in the bracket, so the rigidity of the vehicle front portion structure in the vehicle forward and rearward direction becomes even higher. Consequently, vibration of the steering column can be controlled even more.

DETAILED DESCRIPTION

First Embodiment

Figure 1:
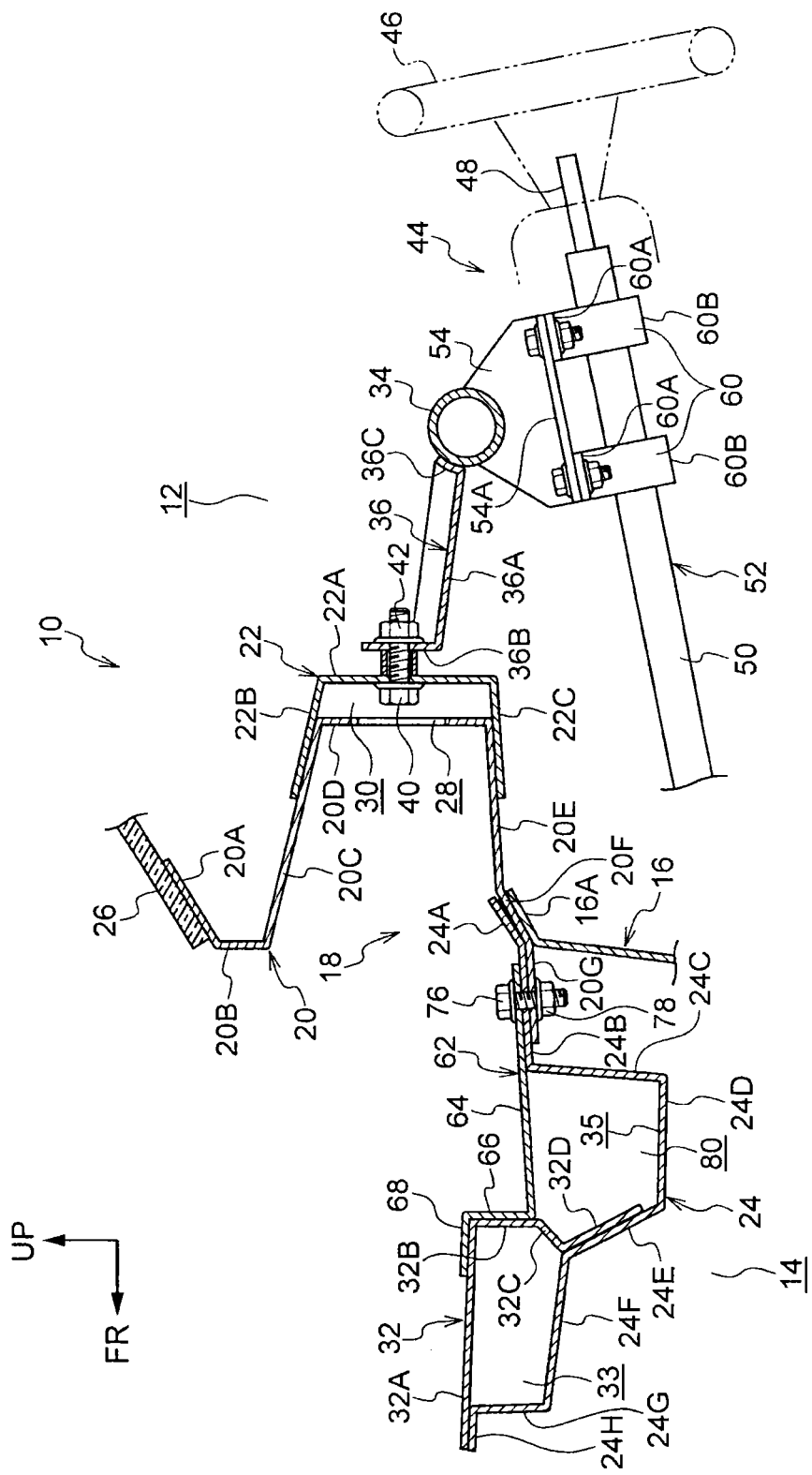
FIG. 1 is a longitudinal sectional view showing a vehicle front portion structure pertaining to a first embodiment of the present invention.

A vehicle front portion structure 10 pertaining to a first embodiment of the present invention will be described with reference to FIG. 1 to FIG. 3. In the drawings referred to below, arrow UP indicates a vehicle upward direction, arrow F indicates a vehicle forward direction, and arrow W indicates a vehicle width direction.

First, the vehicle front portion structure 10 overall will be described with reference to FIG. 1 and FIG. 2. As shown in FIG. 1, the vehicle front portion structure 10 includes a cowl 18 that extends in the vehicle width direction and is disposed on the upper portion of a dash panel 16 that partitions a cabin 12 and an engine compartment 14 from each other.

The cowl 18 is equipped with a cowl inner panel 20 that supports the lower end portion of a front windshield glass 26 and whose longitudinal sectional shape when seen from the vehicle width direction is a substantially S-shape, a cowl back panel 22 that is joined to the vehicle rearward direction end side of the cowl inner panel 20, and a cowl front panel 24 that is fastened to the vehicle forward direction end side of the cowl inner panel 20 and supports the vehicle rearward direction end side of a hood (not shown in the drawings).

As shown in FIG. 1, the cowl inner panel 20 is equipped with an upper end portion 20A that is joined to the lower end portion of the front windshield glass 26, a first vertical wall portion 20B that extends in the vehicle downward direction from the vehicle downward direction end of the upper end portion 20A, an upper wall portion 20C that extends in the vehicle rearward direction from the vehicle downward direction end of the first vertical wall portion 20B, a second vertical wall portion 20D that extends in the vehicle downward direction from the vehicle rearward direction end of the upper wall portion 20C, a bottom wall portion 20E that extends in the vehicle forward direction from the vehicle downward direction end of the second vertical wall portion 20D, a sloping portion 20F that slopes in the vehicle downward direction heading in the vehicle forward direction from the vehicle forward direction end of the bottom wall portion 20E, and a distal end portion 20G that extends in the vehicle forward direction from the vehicle forward direction end of the sloping portion 20F. The sloping portion 20F is joined to a sloping portion 16A formed on the vehicle upward direction end side of the dash panel 16. Furthermore, hole portions 28 for attaching later-described bolts 40 are formed in the second vertical wall portion 20D. Moreover, hole portions for inserting later-described bolts 76 are formed in the distal end portion 20G.

Figure 2:
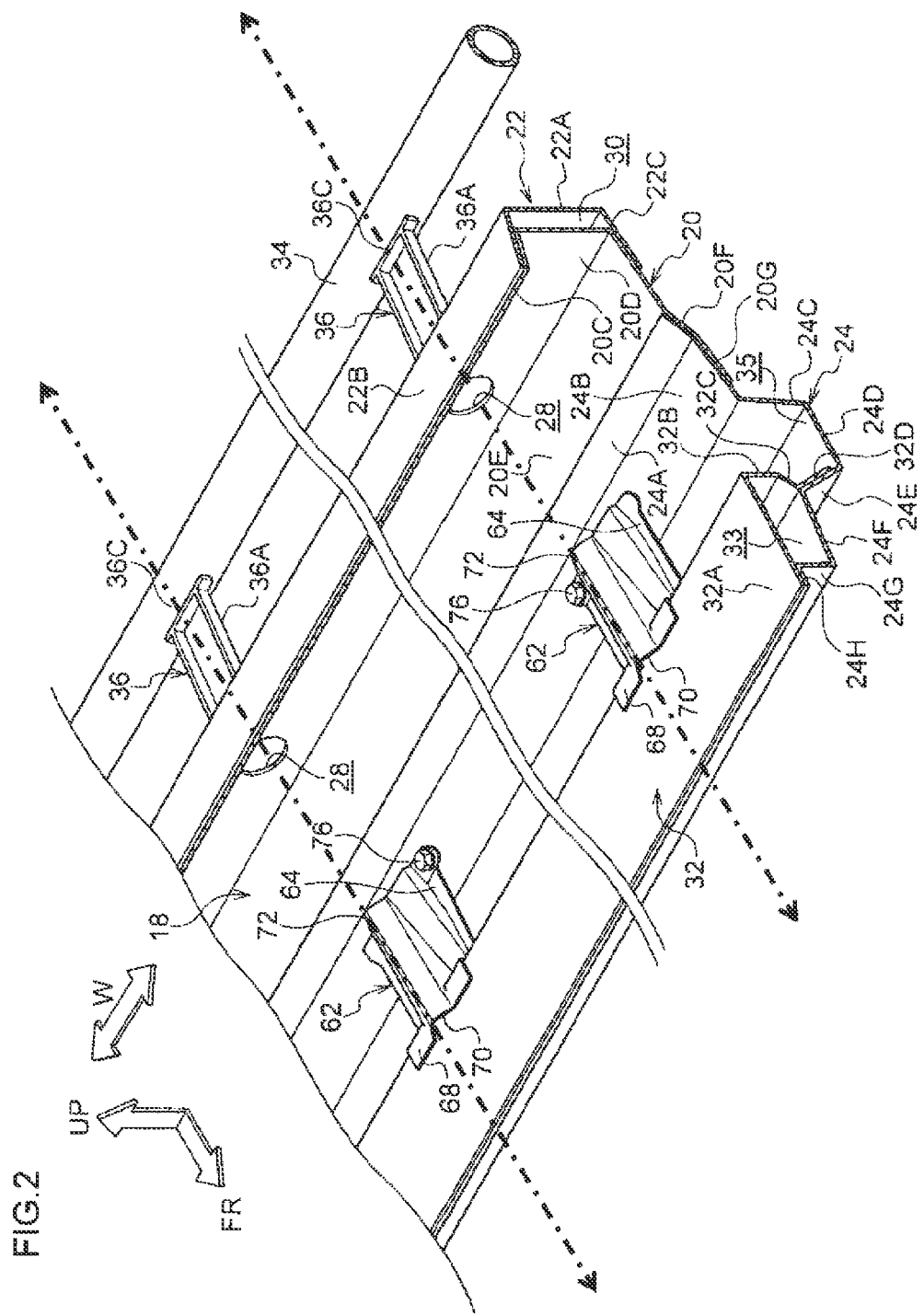
FIG. 2 is a partial perspective view showing the vehicle front portion structure pertaining to the first embodiment of the present invention.
Figure 3:
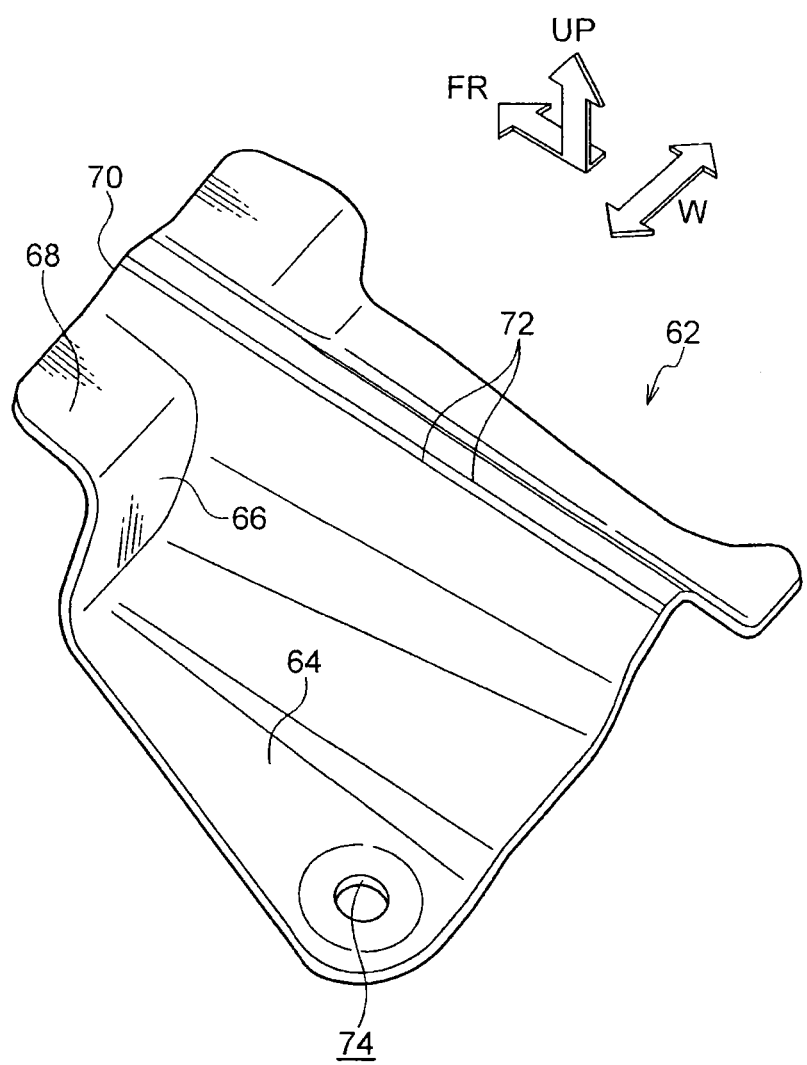
FIG. 3 is a perspective view showing a bracket pertaining to the first embodiment of the present invention.

As shown in FIG. 1 and FIG. 2, the cowl back panel 22 is equipped with a vertical wall portion 22A in which hole portions for inserting the later-described bolts 40 are formed, an upper wall portion 22B that extends in the vehicle forward direction from the vehicle upward direction end of the vertical wall portion 22A, and a lower wall portion 22C that extends in the vehicle forward direction from the vehicle downward direction end of the vertical wall portion 22A. The vehicle forward direction end sides of the upper wall portion 22B and the lower wall portion 22C of the cowl back panel 22 are joined to the vehicle rearward direction end sides of the upper wall portion 20C and the bottom wall portion 20E, respectively, of the cowl inner panel 20. Because of this, a closed cross section portion 30 that corresponds to a second closed cross section portion of the present invention and extends in the vehicle width direction is formed by the cowl inner panel 20 and the cowl back panel 22.

As shown in FIG. 1 and FIG. 2, the cowl front panel 24 is equipped with a rear end portion 24A that is joined to the sloping portion 20F of the cowl inner panel 20 on the vehicle rearward direction end side, a fastening portion 24B that extends in the vehicle forward direction from the vehicle forward direction end of the rear end portion 24A, a first vertical wall portion 24C that extends in the vehicle downward direction from the vehicle forward direction end of the fastening portion 24B, a first bottom wall portion 24D that extends in the vehicle forward direction from the vehicle downward direction end of the first vertical wall portion 24C, a sloping portion 24E that slopes in the vehicle upward direction heading in the vehicle forward direction from the vehicle forward direction end of the first bottom wall portion 24D, a second bottom wall portion 24F that extends in the vehicle forward direction from the vehicle forward direction end of the sloping portion 24E, a second vertical wall portion 24G that extends in the vehicle upward direction from the vehicle forward direction end of the second bottom wall portion 24F, and a distal end portion 24H that extends in the vehicle forward direction from the vehicle upward direction end of the second vertical wall portion 24G.

It should be noted that, on the vehicle forward direction end side of the cowl front panel 24 that extends in the vehicle width direction, a closed cross section portion 33 that extends in the vehicle width direction is formed by a cowl cross member 32 that extends in the vehicle width direction. The cowl cross member 32 is equipped with an upper wall portion 32A that extends in the vehicle forward and rearward direction, a vertical wall portion 32B that extends in the vehicle downward direction from the vehicle rearward direction end of the upper wall portion 32A, a sloping portion 32C that slopes in the vehicle downward direction heading in the vehicle forward direction from the vehicle downward direction end of the vertical wall portion 32B, and a lower end portion 32D that slopes in the vehicle downward direction heading in the vehicle rearward direction from the vehicle downward direction end of the sloping portion 32C. Here, the vehicle forward direction end of the upper wall portion 32A of the cowl cross member 32 is joined by welding, for example, to the distal end portion 24H of the cowl front panel 24, and the lower end portion 32D of the cowl cross member 32 is joined by welding, for example, to the sloping portion 24E of the cowl front panel 24. As a result, the closed cross section portion 33, which corresponds to a first closed cross section portion of the present invention and is surrounded by the second bottom wall portion 24F and the second vertical wall portion 24G of the cowl front panel 24 and the upper wall portion 32A, the vertical wall portion 32B, and the sloping portion 32C of the cowl cross member 32, is formed.

It should be noted that the section formed by the first vertical wall portion 24C, the first bottom wall portion 24D, and the sloping portion 24E of the cowl front panel 24 corresponds to a "recessed portion (that is open toward a vehicle upward side)" of the present invention and will sometimes be called a recessed portion 35.

As shown in FIG. 1 and FIG. 2, an instrument panel reinforcement 34 that extends in the vehicle width direction and is a cylindrical pipe having both ends supported in vehicle side portions is disposed on the vehicle rearward side of the cowl back panel 22. The instrument panel reinforcement 34 is coupled to the cowl back panel 22 via cowl to braces 36, which correspond to a coupling member of the present invention, at predetermined positions in the vehicle width direction.

Each cowl to brace 36 is equipped with a body portion 36A that is cross-sectionally hat-shaped and extends in the vehicle forward and rearward direction, a fastening portion 36B that extends in the vehicle upward direction from the vehicle forward direction end of the body portion 36A, and a joint portion 36C that extends in the vehicle width direction from the vehicle rearward direction end of the body portion 36A. It should be noted that a hole portion for inserting a bolt is formed in the fastening portion 36B, and the fastening portion 36B is fastened by a bolt 40 and a nut 42 to the vertical wall portion 22A of the cowl back panel 22. Furthermore, the joint portion 36C is joined to the outer peripheral surface of the instrument panel reinforcement 34. Because of this, the instrument panel reinforcement 34 is coupled to the cowl back panel 22 (the cowl 18).

A steering device 44 is disposed on the vehicle downward direction side of the instrument panel reinforcement 34. The steering device 44 is equipped with a steering column 52 configured to include a steering wheel 46, a steering shaft 48 to which the steering wheel 46 is joined, and a cylindrical steering column tube 50 that rotatably supports the steering shaft 48.

As shown in FIG. 1, a steering support 54 is attached to the instrument panel reinforcement 34. A pair of mounting brackets (column brackets) 60, 60 are fastened to the steering support 54. Each mounting bracket 60 is equipped with flange portions 60A, which are disposed on both vehicle width direction sides of the mounting bracket 60 (only those on one side are shown in FIG. 1), and a curved portion 60B, which is U-shaped as seen from the vehicle forward and rearward direction and is formed in the vehicle width direction central portion of the mounting bracket 60. Consequently, by fastening the flange portions 60A of the mounting brackets 60 to flange portions 54A of the steering support 54, the steering column 52 is supported on the instrument panel reinforcement 34 via the steering support 54.

Furthermore, as shown in FIG. 2, brackets 62 are disposed on extension lines on the vehicle forward and rearward direction front sides of the cowl to braces 36. That is, the brackets 62 are disposed in the same positions as the cowl to braces 36 in the vehicle width direction on the cowl front panel 24. As shown in FIG. 3, each bracket 62 is equipped with a flat plate portion 64, a vertical wall portion 66 that extends in the vehicle upward direction from the vehicle forward direction end of the flat plate portion 64, and a distal end portion 68 that extends in the vehicle forward direction from the vehicle upward direction end of the vertical wall portion 66. Furthermore, a raised portion 70 that has a substantially triangular shape as seen from the vehicle forward and rearward direction is formed in each bracket 62 and extends in the vehicle forward and rearward direction from the front end (the distal end portion 68) to the rear end (the flat plate portion 64) of the bracket 62. That is, ridgelines 72, 72 of the raised portions 70 are formed in such a way as to coincide with the cowl to braces 36 in the vehicle width direction. It should be noted that hole portions 74 are formed in the vehicle rearward direction end sides of the flat plate portions 64 of the brackets 62 and that the brackets 62 are integrally fastened by bolts 76 and nuts 78 to the fastening portion 24B of the cowl front panel 24 and the distal end portion 20G of the cowl inner panel 20. The vertical wall portions 66 and the distal end portions 68 of the brackets 62 are joined to the vertical wall portion 32B and the upper wall portion 32A, respectively, of the cowl cross member 32. As a result, closed cross section portions 80, which are surrounded by the first vertical wall portion 24C, the first bottom wall portion 24D, and the sloping portion 24E of the cowl front panel 24, the sloping portion 32C and the lower end portion 32D of the cowl cross member 32, and the flat plate portions 64 of the brackets 62, are formed. That is, the closed cross section portions 80 are formed by covering the open side of the recessed portion 35 with the brackets 62 in the vehicle forward and rearward direction.

The action of the vehicle front portion structure 10 configured in this way will be described.

In the vehicle front portion structure 10, the closed cross section portion 33, the recessed portion 35, and the closed cross section portion 30 are formed from the vehicle forward direction end side of the cowl 18. Furthermore, the cowl to braces 36 and the instrument panel reinforcement 34 are disposed on the vehicle rear portion side of the cowl 18. Of these, the closed cross section portion 33, the closed cross section portion 30, and the instrument panel reinforcement 34 extend in the vehicle width direction, and their rigidity is relatively high in the vehicle front portion structure 10.

The rigidity of the vehicle front portion structure 10 in the vehicle forward and rearward direction is enhanced as a result of the instrument panel reinforcement 34 and the closed cross section portion 30 of the cowl 18 (the cowl back panel 22) being coupled to each other in the vehicle forward and rearward direction by the cowl to braces 36 at predetermined positions in the vehicle width direction. Furthermore, the rigidity of the vehicle front portion structure 10 in the vehicle forward and rearward direction is enhanced as a result of the open side of the recessed portion 35 that is formed between the closed cross section portion 33 and the closed cross section portion 30 of the cowl 18 and is open toward the vehicle upward side being closed off in the vehicle forward and rearward direction by the brackets 62 at predetermined positions in the vehicle width direction to form the closed cross section portions 80 (as a result of the closed cross section portion 30 being coupled to the closed cross section portion 33 via the brackets 62).

The vehicle front portion structure 10 supports the steering column 52 via the instrument panel reinforcement 34.

Consequently, the rigidity with which the vehicle front portion structure 10 supports the steering column 52 is enhanced, and vibration of the steering column 52 can be controlled.

In particular, the brackets 62 have the raised portions 70 that are shaped like mountains as seen from the vehicle forward and rearward direction and extend from the vehicle forward and rearward direction front ends to the rear ends of the brackets 62, and the ridgelines 72 of the raised portions 70 are disposed in such a way as to lie on extension lines of the cowl to braces 36 in the vehicle forward and rearward direction, so the rigidity of the vehicle front portion structure 10 in the vehicle forward and rearward direction becomes even higher. Consequently, vibration of the steering column 52 can be controlled even more.

Furthermore, because the ridgelines 72 of the brackets 62 are formed on extension lines on the vehicle forward and rearward direction front sides of the cowl to braces 36, the load input from the vehicle forward direction at the time of a vehicle frontal crash is excellently transmitted in the vehicle rearward direction so that the amount of deformation of the engine compartment 14 can be controlled.

It should be noted that although in the present embodiment a pair of the brackets 62 are disposed in correspondence to a pair of the cowl to braces 36, the vehicle front portion structure 10 is not limited to this and may also have a configuration disposed only with brackets 62 corresponding to some of a plurality of the cowl to braces 36.

For example, vibration of the steering column 52 can be effectively controlled provided that the vehicle front portion structure 10 is disposed with a bracket 62 corresponding to the cowl to brace 36 that is closest to the steering column 52 in the vehicle width direction among a plurality of the cowl to braces 36.

Second Embodiment

A vehicle front portion structure 100 pertaining to a second embodiment of the present invention will be described with reference to FIG. 4. It should be noted that the same reference signs are assigned to the same constituent elements as those in the first embodiment and that detailed description of those same constituent elements will be omitted. Furthermore, only those parts that differ from the first embodiment will be described.

Figure 4:
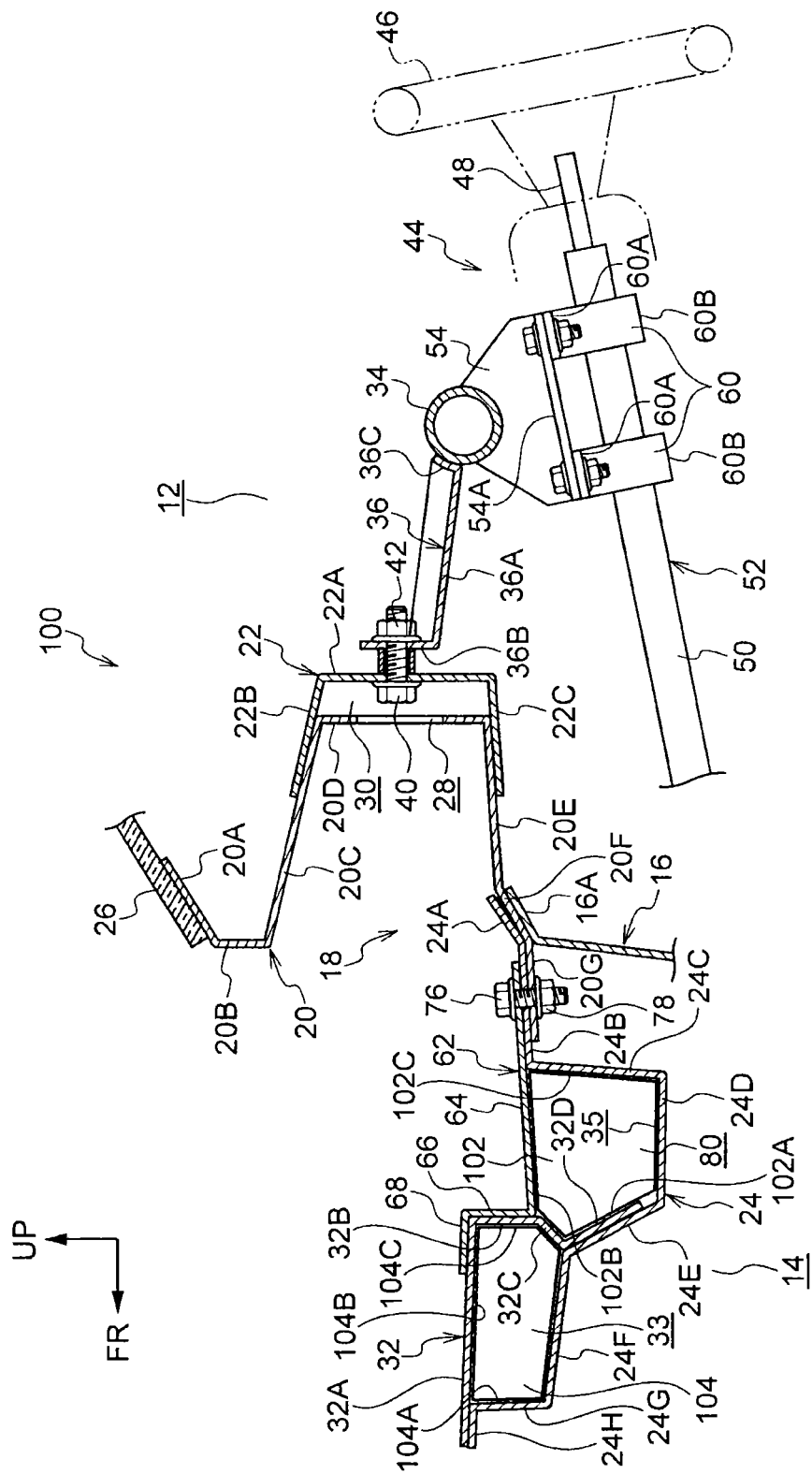
FIG. 4 is a partial perspective view showing a vehicle front portion structure pertaining to a second embodiment of the present invention.

As shown in FIG. 4, in the vehicle front portion structure 100, bulkheads 102 and 104 that are substantially rectangular as seen in the vehicle width direction are disposed inside the closed cross section portion 33 and the closed cross section portion 80, respectively, and are joined to the cowl front panel 24, the cowl cross member 32, and the bracket 62. It should be noted that the bulkhead 102 corresponds to a "reinforcement member" of the present invention.

Specifically, the bulkhead 102 comprises a panel having a shape corresponding to the shape of the closed cross section portion 80 of the cowl front panel 24, with flanges 102A to 102C being formed by bending the end portions of the panel in the vehicle width direction. The bulkhead 102 is fixed in the closed cross section portion 80 as a result of the flange 102A being joined by welding to the sloping portion 24E of the cowl front panel 24 and the lower end portion 32D of the cowl cross member 32, the flange 102B being joined to the flat plate portion 64 of the bracket 62, and the flange 102C being joined by welding to the first vertical wall portion 24C of the cowl front panel 24. In this way, the closed cross section portion 80 is partitioned in the vehicle width direction by the bulkhead 102.

Likewise, the bulkhead 104 comprises a panel having a shape corresponding to the shape of the closed cross section portion 33 of the cowl front panel 24, with flanges 104A to 104C being formed by bending the end portions of the panel in the vehicle width direction. The bulkhead 104 is fixed in the closed cross section portion 33 as a result of the flange 104A being joined by welding to the second vertical wall portion 24G of the cowl front panel 24, the flange 104B being joined to the upper wall portion 32A of the cowl cross member 32 and the distal end portion 68 of the bracket 62, and the flange 104C being joined by welding to the vertical wall portion 32B of the cowl cross member 32 and the vertical wall portion 66 of the bracket 62. Because of this, the closed cross section portion 33 is partitioned in the vehicle width direction by the bulkhead 104.

In this way, by disposing the bulkheads 102 and 104 in the closed cross section portions 80 and 33 formed in the cowl 18, the rigidity of the cowl 18 in the vehicle forward and rearward direction is improved even more, vibration of the steering column 52 is controlled even more, and the load input from the vehicle forward direction at the time of a vehicle frontal crash is efficiently transmitted in the rearward direction so that deformation of the engine compartment 14 is controlled even more.

It should be noted that although in the series of embodiments the cowl 18 is configured by the cowl inner panel 20, the cowl back panel 22, and the cowl front panel 24, the cowl 18 is not limited to this. That is, the cowl 18 may be formed from a single panel or may be configured from plural panels differing from the ones in the embodiments. In either case, it suffices for the structure to be such that the cowl 18 has a recessed portion that is open toward the vehicle upward side, with a closed cross section portion being formed by the bracket 62.

Furthermore, in the series of embodiments, the raised portion 70 (the ridgeline 72) of the bracket 62 extends in the vehicle forward and rearward direction from the front end to the rear end of the bracket 62, but the raised portion 70 (the ridgeline 72) is not limited to this. That is, the raised portion 70 (the ridgeline 72) of the bracket 62 does not have to extend from the front end to the rear end of the bracket 62 provided that it extends in the vehicle forward and rearward direction.

What is claimed is:
1. A vehicle front portion structure, comprising:
   an instrument panel reinforcement that extends in a vehicle width direction and supports a steering column;
   a cowl that is disposed at a vehicle forward side of the instrument panel reinforcement and that is provided with a recessed portion that is open toward a vehicle upward side and extends along the vehicle width direction;

a coupling structure that couples the instrument panel reinforcement and the cowl to each other in a vehicle forward and rearward direction, at a predetermined position in the vehicle width direction; and a bracket that is disposed at the cowl at a front side in the vehicle forward and rearward direction and on an extension line of the coupling structure, that closes off an open side of the recessed portion in the vehicle forward and rearward direction, and that has a ridgeline that extends in the vehicle forward and rearward direction.

2. The vehicle front portion structure according to claim 1, wherein:

a plurality of the coupling structure is disposed at a plurality of predetermined positions in the vehicle width direction of the cowl; and the bracket is disposed on the extension line of one of the plurality of the coupling structure that is closest to a fixed position of the steering column in the vehicle width direction.

3. The vehicle front portion structure according to claim 2, wherein a reinforcement structure that partitions, in the vehicle width direction, a space formed by the bracket and the recessed portion, is disposed between the bracket and the recessed portion.

4. The vehicle front portion structure according to claim 3, further comprising:

a first closed cross section portion that is formed at the cowl at a vehicle forward side of the recessed portion, that extends in the vehicle width direction, and that supports a rear end of a hood; and a second closed cross section portion that is formed at the cowl at a vehicle rearward side of the recessed portion, that is coupled to the instrument panel reinforcement by the coupling structure, and that extends in the vehicle width direction, wherein the bracket is disposed at the cowl between the first closed cross section portion and the second closed cross section portion.

5. The vehicle front portion structure according to claim 1, wherein a reinforcement structure that partitions, in the vehicle width direction, a space formed by the bracket and the recessed portion, is disposed between the bracket and the recessed portion.

6. The vehicle front portion structure according to claim 5, further comprising:

a first closed cross section portion that is formed at the cowl at a vehicle forward side of the recessed portion, that extends in the vehicle width direction, and that supports a rear end of a hood; and a second closed cross section portion that is formed at the cowl at a vehicle rearward side of the recessed portion, that is coupled to the instrument panel reinforcement by the coupling structure, and that extends in the vehicle width direction, wherein the bracket is disposed at the cowl between the first closed cross section portion and the second closed cross section portion.

7. The vehicle front portion structure according to claim 1, further comprising:

a first closed cross section portion that is formed at the cowl at a vehicle forward side of the recessed portion, that extends in the vehicle width direction, and that supports a rear end of a hood; and a second closed cross section portion that is formed at the cowl at a vehicle rearward side of the recessed portion, that is coupled to the instrument panel reinforcement by the coupling structure, and that extends in the vehicle width direction, wherein the bracket is disposed at the cowl between the first closed cross section portion and the second closed cross section portion in the cowl.

8. The vehicle front portion structure according to claim 1, wherein the extension line of the coupling structure extends in the vehicle forward and rearward direction.

* * * * *